(12) United States Patent
Kobayashi et al.

(10) Patent No.: US 8,451,488 B2
(45) Date of Patent: May 28, 2013

(54) IMAGE PROCESSING APPARATUS, METHOD FOR EXECUTING JOB, AND COMPUTER-READABLE STORAGE MEDIUM FOR COMPUTER PROGRAM

(75) Inventors: Minako Kobayashi, Ikeda (JP);
Takehisa Yamaguchi, Ikoma (JP);
Katsuhiko Akita, Amagasaki (JP);
Kazuya Anezaki, Amagasaki (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 356 days.

(21) Appl. No.: 12/969,214

(22) Filed: Dec. 15, 2010

(65) Prior Publication Data
US 2011/0141520 A1 Jun. 16, 2011

(30) Foreign Application Priority Data
Dec. 16, 2009 (JP) ................. 2009-285263

(51) Int. Cl.
*G06K 15/00* (2006.01)
*G06K 15/02* (2006.01)
*G06F 3/12* (2006.01)

(52) U.S. Cl.
USPC ......... 358/1.16; 358/1.15; 358/1.11; 358/1.9; 358/3.23

(58) Field of Classification Search
None
See application file for complete search history.

(56) References Cited

U.S. PATENT DOCUMENTS

| | | | |
|---|---|---|---|
| 7,612,919 B2 | 11/2009 | Takahashi | |
| 2003/0234949 A1* | 12/2003 | Kageyama et al. | 358/1.13 |
| 2006/0221358 A1* | 10/2006 | Takahashi | 358/1.1 |
| 2009/0268236 A1* | 10/2009 | Miyata | 358/1.15 |

FOREIGN PATENT DOCUMENTS

| | | |
|---|---|---|
| JP | 2006-285610 | 10/2006 |
| JP | 2008-3954 | 1/2008 |
| JP | 2008-40899 | 2/2008 |

OTHER PUBLICATIONS

Japanese Notification of Reasons for Refusal mailed Nov. 29, 2011, directed to Japanese Application No. 2009-285263; 7 pages.

* cited by examiner

*Primary Examiner* — Thomas Lett
(74) *Attorney, Agent, or Firm* — Morrison & Foerster LLP

(57) ABSTRACT

An image processing apparatus reads out job ticket data indicating first conditions used for executing a job and a permission to change each of the first conditions and lack thereof. The image processing apparatus, then, reads out a functional conditions table indicating a first group made by grouping second conditions having a common concept and a second group made by grouping the first group having a common concept. Then, the image processing apparatus presents, as options for changing a first condition to which applying a change is prohibited, second conditions included in a first group to which a second condition that is the same as the first condition belongs. The image processing apparatus presents, as options for changing a first condition to which applying a change is allowed, second conditions included in a second group to which a second condition that is the same as the first condition belongs.

8 Claims, 28 Drawing Sheets

| BROAD CONCEPT | NARROW CONCEPT |
|---|---|
| JPEG | ORIGINAL JPEG |
|  | JPEG2000 |
| PDF | ORIGINAL PDF |
|  | COMPACT PDF |
|  | OUTLINE PDF |
|  | SEARCHABLE PDF |
|  | PDF/A |
| XPS | ORIGINAL XPS |
|  | COMPACT XPS |
| TIFF | MF |
|  | MMR |

| BROAD CONCEPT | NARROW CONCEPT |
|---|---|
| COLOR SCAN | AUTOMATIC COLOR |
| | FULL-COLOR |
| BLACK-AND-WHITE SCAN | GRAYSCALE |
| | BINARY |

| BROAD CONCEPT | NARROW CONCEPT |
|---|---|
| ADF | YES |
| | NO |

| BROAD CONCEPT | NARROW CONCEPT |
|---|---|
| SURFACE TO BE SCANNED | DOUBLE-SIDED |
| | SINGLE-SIDED |

| BROAD CONCEPT | NARROW CONCEPT |
|---|---|
| SCAN RESOLUTION | 300dpi |
| | 400dpi |
| | 600dpi |

| BROAD CONCEPT | NARROW CONCEPT |
|---|---|
| SHARABLE SAVING DESTINATION | FTP SERVER |
| | WEBDAV SERVER |
| | SMB SHARED FOLDER |
| NON-SHARABLE SAVING DESTINATION | ELECTRONIC MAIL |
| | SMB NON-SHARED FOLDER |

| BROAD CONCEPT | NARROW CONCEPT |
|---|---|
| COMPRESSION | AES |
|  | ZIP |
|  | LHA |

| BROAD CONCEPT | NARROW CONCEPT |
|---|---|
| SCAN SIZE | SPECIFY DOCUMENT SIZE |
| | NON-CONSOLIDATED |
| | LONG SCAN |

| BROAD CONCEPT | NARROW CONCEPT |
|---|---|
| COLOR PRINTING | AUTOMATIC COLOR |
| | FULL-COLOR |
| | TWO-COLOR |
| | BASIC COLOR |
| | MONO COLOR |
| BLACK-AND-WHITE PRINTING | GRAYSCALE |
| | BINARY |

| BROAD CONCEPT | NARROW CONCEPT |
|---|---|
| COLOR DELIVERY | AUTOMATIC COLOR |
|  | FULL-COLOR |
|  | TWO-COLOR |
|  | BASIC COLOR |
|  | MONO COLOR |
| BLACK-AND-WHITE DELIVERY | GRAYSCALE |
|  | BINARY |

| BROAD CONCEPT | NARROW CONCEPT |
|---|---|
| PULL PRINTING | SMB PULL PRINTING |
| | FTP PULL PRINTING |
| | BROWSER PULL PRINTING |
| | WEBDAV PULL PRINTING |
| MEDIA PRINTING | USB MEMORY PRINTING |
| | MOBILE PHONE PULL PRINTING |

| BROAD CONCEPT | NARROW CONCEPT |
|---|---|
| ADDITION OF GROUND DESIGN | COPY PROTECTION |
| | COPY GUARD |
| | ADDITION OF MANAGEMENT NUMBER |

| BROAD CONCEPT | NARROW CONCEPT |
|---|---|
| PRIOR CONFIRMATION | CONFIRMATION PRINTING |
| | PREVIEW SCREEN DISPLAY |

| BROAD CONCEPT | NARROW CONCEPT |
|---|---|
| STAPLING | ONE-POSITION STAPLING |
| | TWO-POSITION STAPLING |
| PUNCH HOLE | LONGER SIDE |
| | SHORTER SIDE |

| BROAD CONCEPT | NARROW CONCEPT |
|---|---|
| PHOTOGRAPH | PHOTOGRAPHIC PAPER |
| | PRINTED PICTURE |

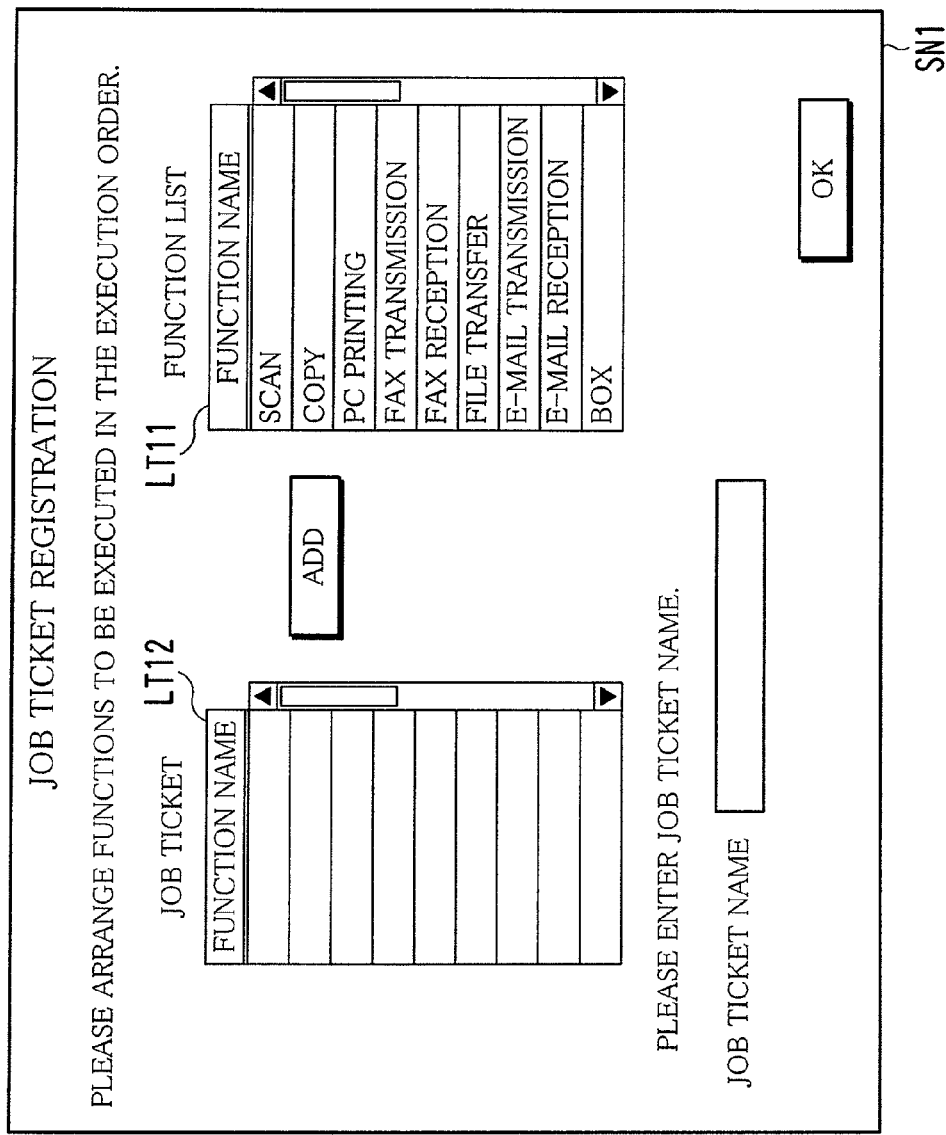

FIG. 9

JOB TICKET REGISTRATION

PLEASE ARRANGE FUNCTIONS TO BE EXECUTED IN THE EXECUTION ORDER.

LT11  FUNCTION LIST

| FUNCTION NAME |
|---|
| SCAN |
| COPY |
| PC PRINTING |
| FAX TRANSMISSION |
| FAX RECEPTION |
| FILE TRANSFER |
| E-MAIL TRANSMISSION |
| E-MAIL RECEPTION |
| BOX |

ADD

LT12  JOB TICKET

| FUNCTION NAME |
|---|
| SCAN |
| FILE TRANSFER |
|  |
|  |
|  |
|  |

PLEASE ENTER JOB TICKET NAME.

JOB TICKET NAME

JOB TICKET NAME: SCAN_TO_DOCUMENT SHARED

| FUNCTION NAME | CONDITION NAME | CONDITION DETAILS | CHANGE ALLOWED/DENIED |
|---|---|---|---|
| SCAN FUNCTION | ADF | NO | ALLOWED |
| | SURFACE TO BE SCANNED | DOUBLE-SIDED | ALLOWED |
| | SCAN RESOLUTION | 300dpi | DENIED |
| | COLOR SCAN/BLACK-AND-WHITE SCAN | FULL-COLOR | ALLOWED |
| | IMAGE DATA FORMAT | COMPACT PDF | DENIED |
| FILE TRANSFER FUNCTION | TRANSFER DESTINATION | FTB SERVER | DENIED |
| | COMPRESSION | ZIP | ALLOWED |

FIG. 13

JOB TICKET TO BE USED
PLEASE CHANGE CONDITIONS, IF NECESSARY, FOR EACH FUNCTION OF THE JOB TICKET.

SCAN
- ADF: NO ▶ Pd
- SURFACE TO BE SCANNED: DOUBLE-SIDED ▶ Pd
- SCAN RESOLUTION: 300dpi ▶ Pd
- COLOR SCAN/BLACK-AND-WHITE SCAN: FULL-COLOR ▶ Pd
- IMAGE DATA FORMAT: COMPACT PDF ▶ Pd FILE TRANSFER
- TRANSFER DESTINATION: FTP SERVER ▶ Pd
- COMPRESSION: ZIP ▶ Pd

JOB TICKET NAME: SCAN_TO_DOCUMENT SHARED

| FUNCTION NAME | CONDITION NAME | CONDITION DETAILS | CHANGE ALLOWED/DENIED |
|---|---|---|---|
| SCAN FUNCTION | ADF | NO | ALLOWED |
| | SURFACE TO BE SCANNED | DOUBLE-SIDED | ALLOWED |
| | SCAN RESOLUTION | 300dpi | DENIED |
| | COLOR SCAN/BLACK-AND-WHITE SCAN | FULL-COLOR | ALLOWED |
| | IMAGE DATA FORMAT | PDF | DENIED |
| FILE TRANSFER FUNCTION | TRANSFER DESTINATION | FTB SERVER | DENIED |
| | COMPRESSION | ZIP | ALLOWED |

FIG. 16

JOB TICKET TO BE USED

PLEASE CHANGE CONDITIONS, IF NECESSARY, FOR EACH FUNCTION OF THE JOB TICKET.

SCAN

| | | |
|---|---|---|
| ADF | NO | ▶ Pd |
| SURFACE TO BE SCANNED | DOUBLE-SIDED | ▶ Pd |
| SCAN RESOLUTION | 300dpi | ▶ Pd |
| COLOR SCAN/BLACK-AND-WHITE SCAN | FULL-COLOR | ▶ Pd |
| IMAGE DATA FORMAT | PDF | ▶ Pd |

FILE TRANSFER

| | | |
|---|---|---|
| TRANSFER DESTINATION | FTP SERVER | ▶ Pd |
| COMPRESSION | ZIP | ▶ Pd |

OK

SN4

IMAGE PROCESSING APPARATUS, METHOD FOR EXECUTING JOB, AND COMPUTER-READABLE STORAGE MEDIUM FOR COMPUTER PROGRAM

This application is based on Japanese patent application No. 2009-285263 filed on Dec. 16, 2009, the contents of which are hereby incorporated by reference.

BACKGROUND OF THE INVENTION

1. Field of the Invention

The present invention relates to an image processing apparatus configured to use a job ticket, a method for executing a job using a job ticket, and so on.

2. Description of the Related Art

Image processing apparatuses having a variety of functions, such as copying, PC printing, scanning, faxing, and file transfer, have recently come into widespread use. Such image processing apparatuses are sometimes called "multifunction devices", "Multi-Function Peripherals (MFPs)", or the like.

Further, an image processing apparatus that can handle a job ticket has recently been realized. A job ticket contains, therein, process steps of a job, conditions for each process of the job, and so on. A user uses such a job ticket like a job template, so that he/she can easily specify conditions in such an image processing apparatus.

A printing controller capable of handling a job ticket is disclosed in Japanese Laid-open Patent Publication No. 2008-040899. The printing controller stores, therein, an overwritten job ticket for defining forced print attributes and a standard value job ticket for defining standard print attributes. Then, a received original job ticket is overwritten based on the overwritten job ticket regardless of whether or not the print attributes are described, and, only when the print attributes are not described, the received original job ticket is overwritten based on the standard value job ticket. Consequently, a corrected job ticket is created.

In essence, according to the printing controller disclosed in Japanese Laid-open Patent Publication No. 2008-040899, conditions such as print attributes defined in the overwritten job ticket are absolute and not allowed to be changed.

Forcing the use of job conditions results in, for example, a disadvantage that a job ticket cannot be used in an image processing apparatus to which the job conditions are not applicable. On the other hand, forcing the use of print attributes is advantageous, for example, for the case of using a job ticket in an organization.

SUMMARY

The present disclosure is directed to solve the problems pointed out above, and therefore, an object of an embodiment of the present invention is to enable a user to use a job ticket more flexibly than is conventionally possible, taking conditions for which making a change is prohibited into consideration.

According to an aspect of the present invention, an image processing apparatus includes a job ticket data obtaining portion that obtains job ticket data, the job ticket data indicating a job involving a plurality of processes, first conditions used for performing the plurality of processes, and information on whether changing each of the first conditions is allowed or not, a group data obtaining portion that obtains group data indicating a first group and a second group, the first group being made by grouping second conditions having a common concept, the second group being made by grouping the first group having a common concept, a presenting portion that shows options for changing at least one of the first conditions indicated in the job ticket data in the following manner, wherein, if the job ticket data indicates that changing said at least one of the first conditions is allowed, then the presenting portion shows the second conditions belonging to the second group to which an identical condition belongs, the identical condition being one of the second conditions and being identical to said at least one of the first conditions, and, if the job ticket data indicates that changing said at least one of the first conditions is not allowed, then the presenting portion shows the second conditions included in the first group to which the identical condition belongs, and a job execution portion that executes the job based on a selected option and the job ticket data in such a manner that the selected option takes precedence over the job ticket data.

Alternatively, the presenting portion shows options for changing at least one of the first conditions indicated in the job ticket data in the following manner, wherein, if the job ticket data indicates that changing said at least one of the first conditions is allowed, and if the group data indicates an identical condition that is one of the second conditions and is identical to said at least one of the first conditions, then the presenting portion shows the second conditions belonging to the second group to which the identical condition belongs; if the job ticket data indicates that changing said at least one of the first conditions is allowed, and if the group data indicates, as the first group, a sub group including a condition that corresponds to a narrow concept of said at least one of the first conditions as the second condition, then the presenting portion shows the second conditions belonging to the second group to which the sub group belongs; if the job ticket data indicates that changing said at least one of the first conditions is not allowed, and if the group data indicates the identical condition, then the presenting portion shows the second conditions included in the first group to which the identical condition belongs; and if the job ticket data indicates that changing said at least one of the first conditions is not allowed, and if the group data indicates the sub group, then the presenting portion shows the second conditions included in the sub group.

An example of "job ticket data" described in the appended claims is "job ticket data 5B" shown in FIG. 11. The job ticket data 5B is job ticket data for a job named "Scan_To_Document shared job". The Scan_To_Document shared job involves a scan process and a file transfer process. The job ticket data 5B indicates, as the first conditions for the scan process, conditions regarding ADF, surfaces to be scanned, scan resolution, color scan/black-and-white scan, and image data formats. The job ticket data 5B also indicates, as the first conditions for the file transfer process, conditions regarding transfer destinations and compression.

An example of "group data" described in the appended claims is "functional conditions table TL" shown in FIGS. 5A-5E. For example, two of the second conditions named "original JPEG" and "JPEG2000" are classified into a first group based on the common concept of "JPEG". Likewise, five of the second conditions for PDF are classified into a first group based on the common concept of "PDF". Two of the second conditions for XPS are classified into a first group based on the common concept of "XPS". Two of the second conditions for TIFF are classified into a first group based on the common concept of "TIFF". Further, four of the first groups are grouped into one second group having the common concept of "image format". The functional conditions table TL shows the relationship of the second group, the first group, and the second conditions.

These and other characteristics and objects of the present invention will become more apparent by the following descriptions of preferred embodiments with reference to drawings.

BRIEF DESCRIPTION OF THE DRAWINGS

FIGS. 5A-5E are diagrams illustrating an example of functional conditions tables.

FIGS. 6A-6E are diagrams illustrating an example of functional conditions tables.

FIGS. 7A-7E are diagrams illustrating an example of functional conditions tables.

FIG. 8 is a diagram illustrating an example of a job ticket registration screen before a function is selected.

FIG. 9 is a diagram illustrating an example of a job ticket registration screen after a function is selected.

FIG. 11 is a diagram illustrating an example of job ticket data.

FIG. 13 is a diagram illustrating an example of a job execution screen.

FIG. 15 is a diagram illustrating an example of job ticket data.

FIG. 16 is a diagram illustrating an example of a job execution screen.

DESCRIPTION OF THE PREFERRED EMBODIMENTS

Figure 1:
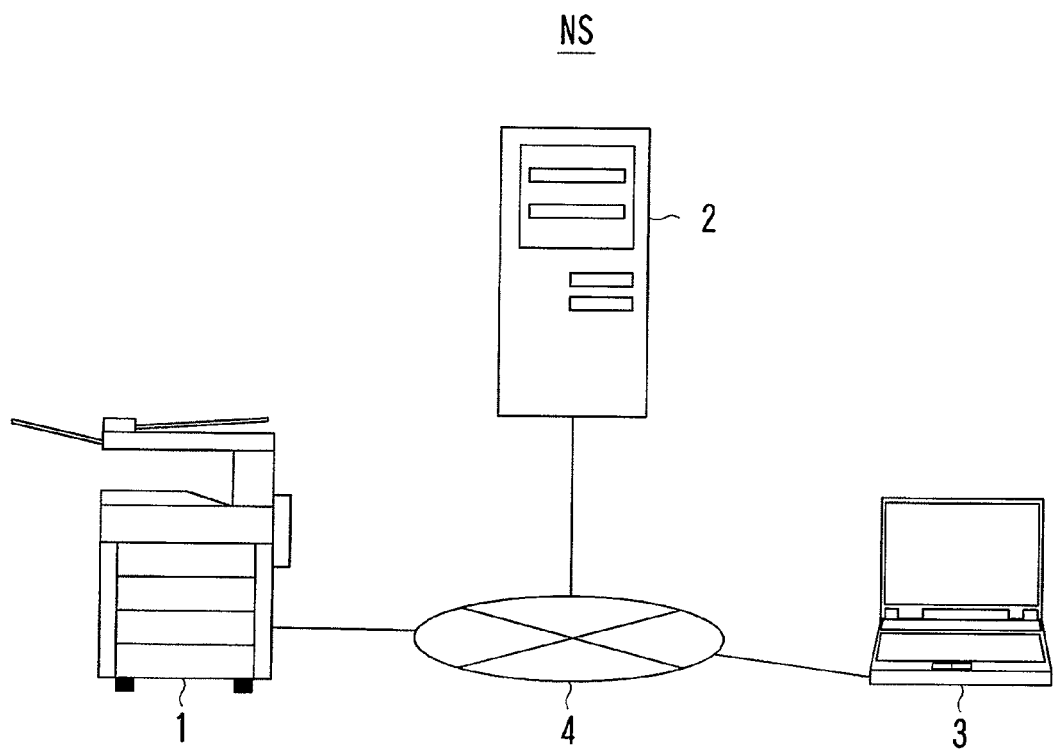
FIG. 1 is a diagram illustrating an example of the overall configuration of a network system.
Figure 2:
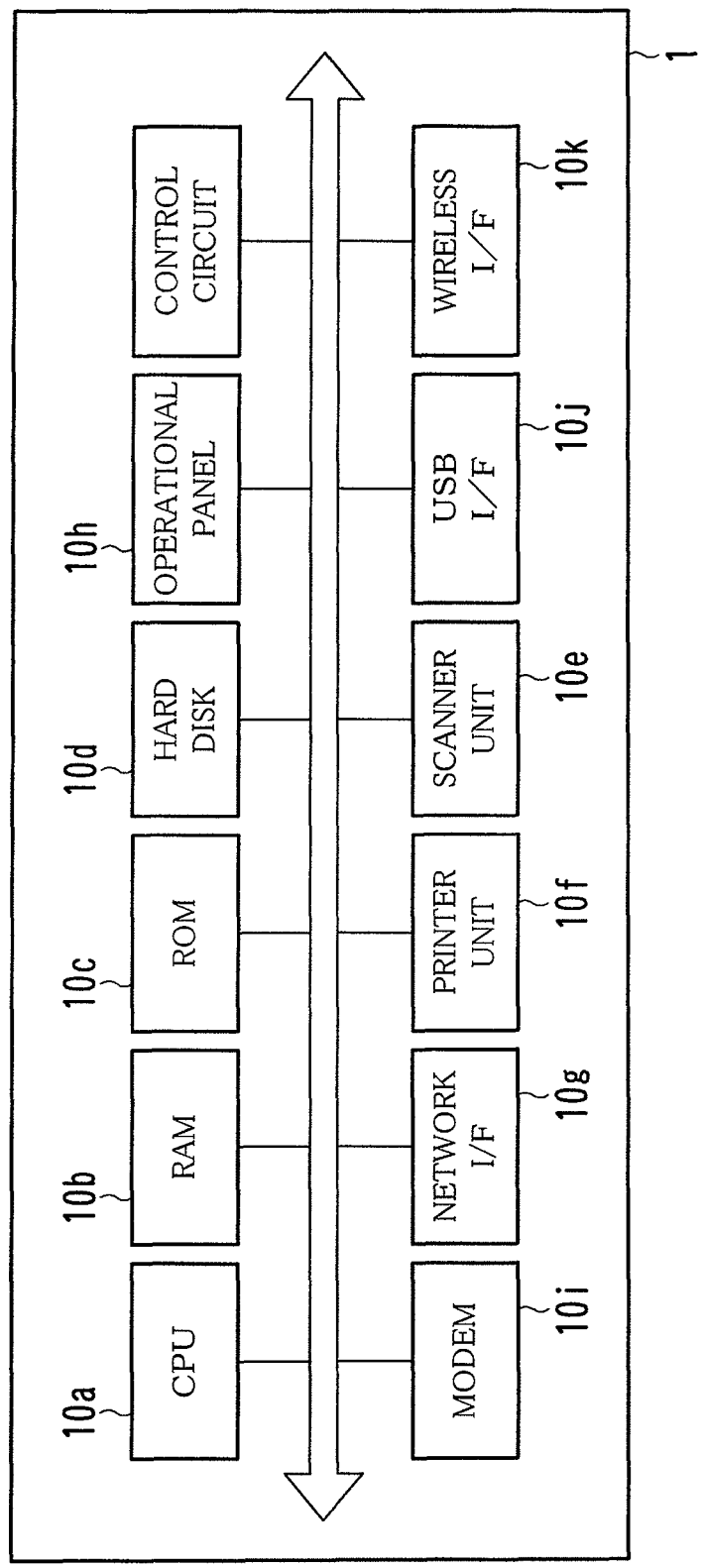
FIG. 2 is a diagram illustrating an example of the hardware configuration of an image forming apparatus.
Figure 3:
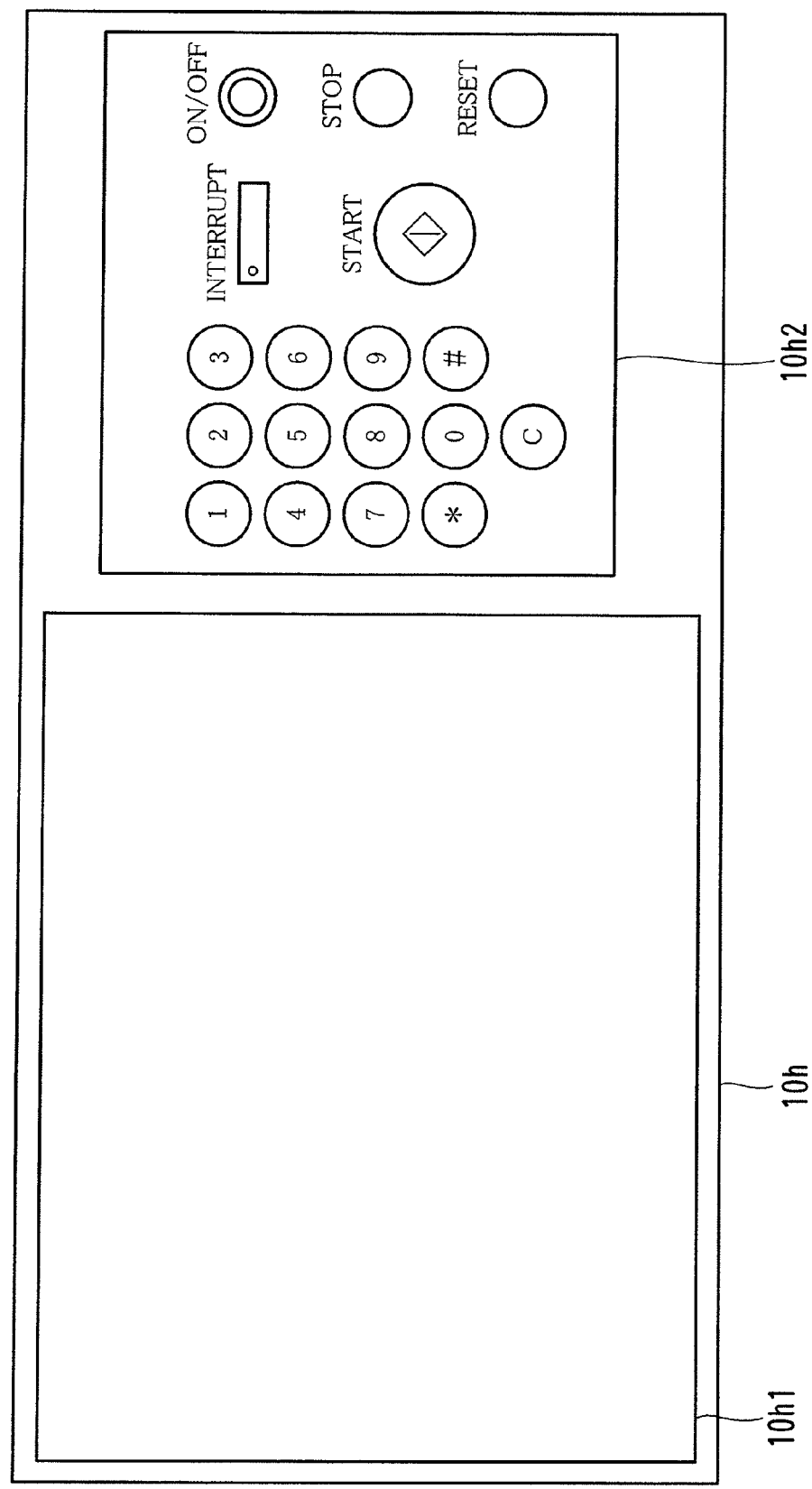
FIG. 3 is a diagram illustrating an example of an operational panel.
Figure 4:
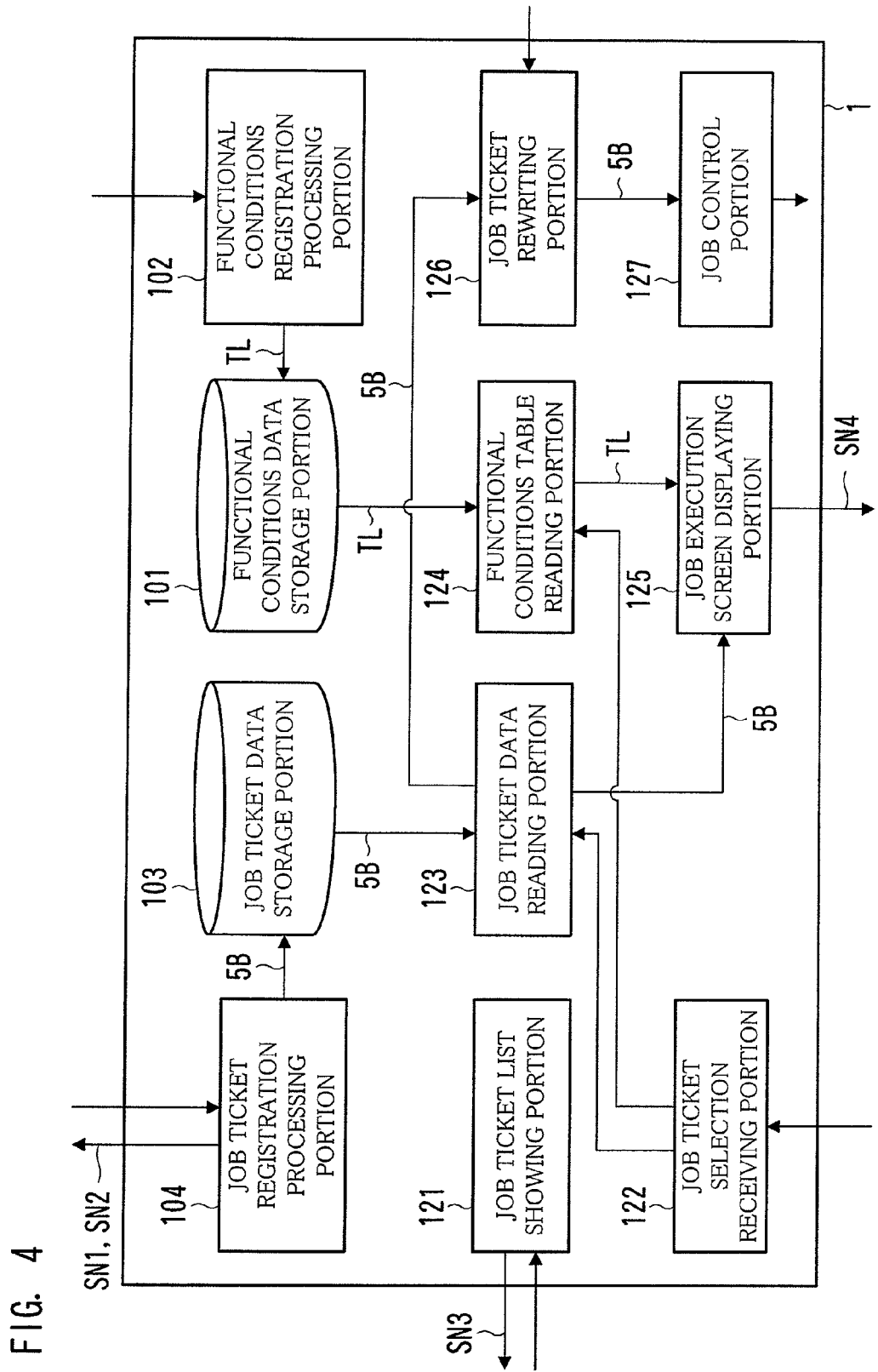
FIG. 4 is a diagram illustrating an example of the functional configuration of an image forming apparatus.

FIG. 1 is a diagram illustrating an example of the overall configuration of a network system NS; FIG. 2 is a diagram illustrating an example of the hardware configuration of an image forming apparatus 1; FIG. 3 is a diagram illustrating an example of an operational panel 10h; and FIG. 4 is a diagram illustrating an example of the functional configuration of the image forming apparatus 1.

Referring to FIG. 1, the network system NS is configured of the image forming apparatus 1, a server 2, a terminal 3, a communication line 4, and so on. The image forming apparatus 1, the server 2, and the terminal 3 are connectable to one another via the communication line 4. Examples of the communication line 4 are a public line, a dedicated line, the Internet, and a so-called Local Area Network (LAN).

The image forming apparatus 1 is an image processing apparatus generally called a multifunction device or a Multi Function Peripheral (MFP). The image forming apparatus 1 is a device that integrates a variety of functions, such as copying, PC printing (network printing), fax transmission, fax reception, scanning, box function, file transfer, and an electronic mail communication, into a single unit.

The "PC printing function" is a function to print an image onto paper based on image data received from the terminal 3.

The "box function" is a function in which a storage area called a "box", "personal box", or the like is allocated to each user, and the user saves data such as image data to his/her own storage area and manages the data therein. The box corresponds to a "folder" or a "directory" in a personal computer.

Besides, the image forming apparatus 1 is equipped with functions including data format conversion, stapling, and preview.

In some cases, one function is implemented by performing only one process. In other cases, one function is implemented by performing a plurality of processes. For example, the scanning function involves at least two processes: a process for scanning an image to generate raw data; and a process for converting the generated raw data into general-purpose format data. The scanning function sometimes requires a process for feeding paper to a document platen using an Automatic Document Feeder (ADF).

A user combines those functions in various ways, or specifies process conditions involved in the individual functions in various ways; thereby to enable the image forming apparatus 1 to execute a variety of jobs. The user can also register such jobs obtained by combining the functions or specifying the process conditions in the image forming apparatus 1 in the form of "job ticket". For example, the user can register a job implemented by combining the scanning function and the file transfer function in the image forming apparatus 1 as a job ticket named "Scan_To_Document shared".

The user can also specify conditions for processes performed based on the individual functions constituting a job ticket.

Referring to FIG. 2, the image forming apparatus 1 is configured of a Central Processing Unit (CPU) 10a, a Random Access Memory (RAM) 10b, a Read Only Memory (ROM) 10c, a hard disk 10d, a scanner unit 10e, a printer unit 10f, a network interface 10g, an operational panel 10h, a modem 10i, a Universal Serial Bus (USB) interface 10j, a wireless interface 10k, a control circuit, and so on.

The scanner 10e is a device to read images depicted on paper, i.e., images such as photographs, characters, drawings, diagrams, and the like, and create image data thereof.

The printer unit 10f serves to print, onto paper, a document image captured by the scanner unit 10e or a document image included in image data received from another device.

The operational panel 10h is configured of a touchscreen 10h1, a group of keys 10h2, and the like as shown in FIG. 3.

The touchscreen 10h1 displays, for example, a screen for giving a message to a user, a screen for displaying the result of a process, and a screen for the user to enter a command to be given to the image forming apparatus 1. The touchscreen 10h1 also detects a position thereof touched (pressed) by the user and informs the CPU 10a of the touched position.

The group of keys 10h2 includes a numerical keypad, a start key, and a stop key.

The user performs operation on the operational panel 10h; thereby to give a command to the image forming apparatus 1 or to enter data thereinto. The user can also perform a work for generating a job ticket, which is described later, by operating the operational panel 10h.

The network interface log is a Network Interface Card (NIC) for communicating with the server 2 and the terminal 3 via the communication line 4 according to Transmission Control Protocol/Internet Protocol (TCP/IP).

The modem 10i is a device to perform communication with another facsimile terminal via a fixed-line telephone network based on a protocol such as Group 3 (G3).

The USB interface 10j is a USB interface board for performing communication with a so-called USB device, e.g., a USB flash memory and a portable hard disk.

The wireless interface 10k is an interface for a so-called short distance radio communication such as an infrared communication. The wireless interface 10k serves to communicate with a mobile phone terminal or a Personal Digital Assistant (PDA). A device performing radio communication based on Bluetooth is used as the wireless interface 10k.

Referring to FIG. 4, the ROM 10c or the hard disk 10d stores programs for implementing functions of a functional conditions data storage portion 101, a functional conditions registration processing portion 102, a job ticket data storage portion 103, a job ticket registration processing portion 104, a job ticket list showing portion 121, a job ticket selection receiving portion 122, a job ticket data reading portion 123, a functional conditions table reading portion 124, a job execution screen displaying portion 125, a job ticket rewriting portion 126, a job control portion 127, and so on. These programs are loaded into the RAM 10b as necessary, whereupon the programs are executed by the CPU 10a.

Referring back to FIG. 1, the server 2 stores, therein, a plurality of document files for reproducing documents formed of photographs, characters, drawings, diagrams, and the like, and provides the image forming apparatus 1 or the terminal 3 with a document file in response to a request from a user. Formats of the document files are, for example, a Portable Document Format (PDF), and a Tagged Image File Format (TIFF).

The terminal 3 is a client of the image forming apparatus 1. A driver for causing the image forming apparatus 1 to perform a process for printing an image and other processes is installed on the terminal 3. Examples of the terminal 3 are a personal computer and a Personal Digital Assistant (PDA).

The following is a detailed description of roles of the individual portions of the image forming apparatus 1 shown in FIG. 4 and processes performed by the individual portions.

[Preparation of Job Ticket, Etc.]

Figure 10:
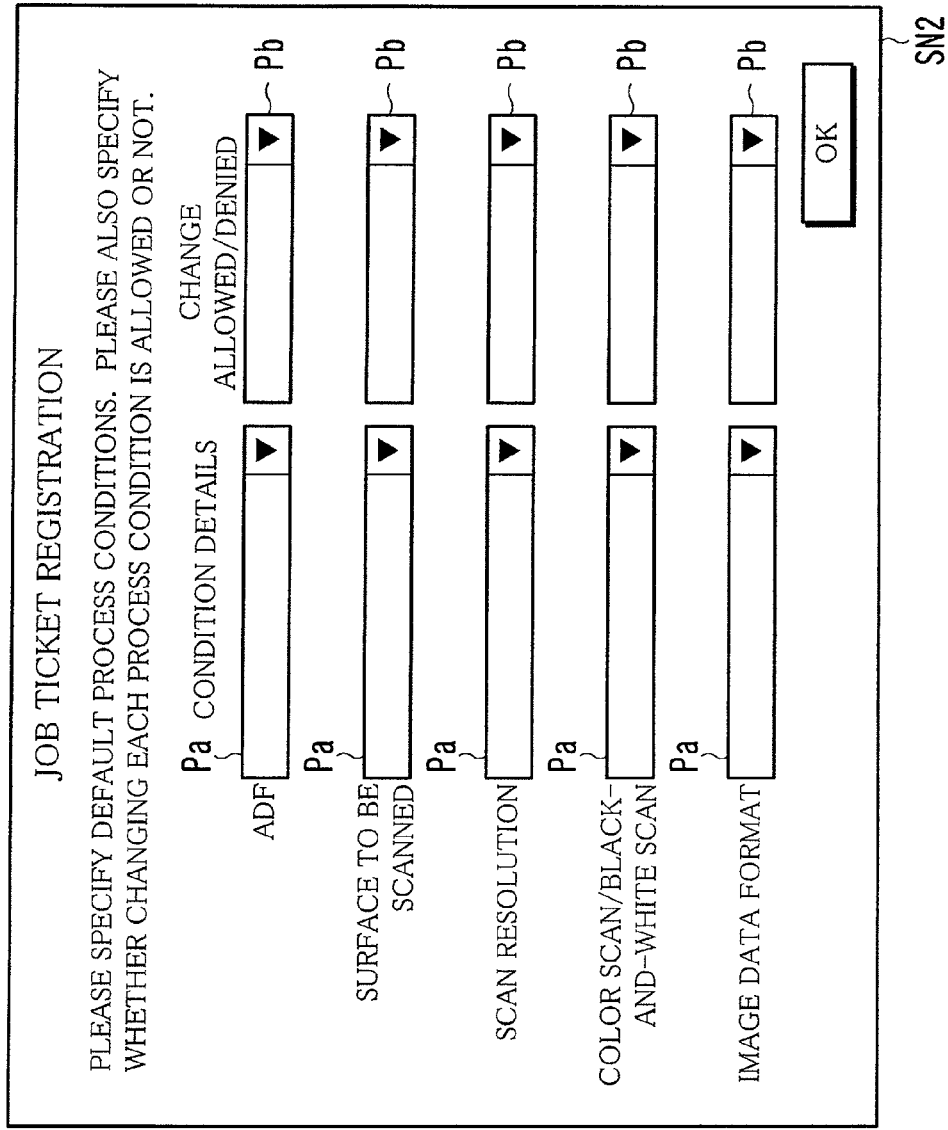
FIG. 10 is a diagram illustrating an example of a conditions specifying screen.

FIGS. 5A-5E are diagrams illustrating an example of functional conditions tables TL01-TL05; FIGS. 6A-6E are diagrams illustrating an example of functional conditions tables TL06-TL10; FIGS. 7A-7E are diagrams illustrating an example of functional conditions tables TL11-TL15; FIG. 8 is a diagram illustrating an example of a job ticket registration screen SN1 before a function is selected; FIG. 9 is a diagram illustrating an example of the job ticket registration screen SN1 after a function is selected; FIG. 10 is a diagram illustrating an example of a conditions specifying screen SN2; and FIG. 11 is a diagram illustrating an example of job ticket data 5B.

Referring to FIG. 4, the functional conditions data storage portion 101 stores, therein, data on a plurality of conditions that can be specified for the case of using functions of the image forming apparatus 1, and on relationships between one condition and another.

To be specific, the functional conditions data storage portion 101 stores, therein, the functional conditions tables TL shown in FIGS. 5A-7E. Hereinafter, the functional conditions tables TL are sometimes distinguished from one another as a "functional conditions table TL01", a "functional conditions table TL01", and so on.

A "narrow concept" field of one functional conditions table TL indicates a plurality of conditions corresponding to an identical type, i.e., a plurality of conditions having an identical concept, property, or attribute. Hereinafter, a type of condition is referred to as a "condition type". For example, referring to FIG. 5A, the "narrow concept" field of the functional conditions table TL01 corresponding to a condition type of "image data format" indicates a plurality of conditions for image data format that can be handled by the image forming apparatus 1, e.g., "original JPEG", "JPEG 2000", "original PDF", and "compact PDF".

Further, depending on the condition type, each condition is defined as a narrow concept falling under any one of a plurality of broad concepts. In the case of the image data format, for example, each condition is defined as a narrow concept falling under any one of four broad concepts: "Joint Photographic Experts Group (JPEG)", "PDF", "XML Paper Specification (XPS)", and "TIFF".

The functional conditions registration processing portion 102 performs a process for generating a new functional conditions table TL to store the same into the functional conditions data storage portion 101, a process for updating an existing functional conditions table TL, and other processes.

Suppose that, for example, at the start of the operation, the image forming apparatus 1 can handle only an "original JPEG" data format, and thereafter, the image forming apparatus 1 is so extended that it can handle a "JPEG 2000" data format. In such a case, the functional conditions registration processing portion 102 generates a functional conditions table TL01 in such a manner that two conditions of "original JPEG" and "JPEG 2000" are indicated in the "narrow concept" field, and further, both the conditions belong to the broad concept "JPEG", and then, stores the generated functional conditions table TL01 into the functional conditions data storage portion 101.

After that, if the image forming apparatus 1 is so extended that it can handle three data formats of "original PDF", "compact PDF", and "outline PDF", then the functional conditions registration processing portion 102 updates the functional conditions table TL01 in such a manner that "PDF" is added as the broad concept and these three conditions belong to the broad concept "PDF".

Further, thereafter, if the image forming apparatus 1 is so extended that it can handle two data formats of "searchable PDF" and "PDF/A", then the functional conditions registration processing portion 102 updates the functional conditions table TL01 in such a manner that these two conditions belong to the broad concept "PDF".

In addition to the functional conditions table TL01 as described above, the functional conditions data storage portion 101 also stores, therein, the following functional conditions tables TL indicating functions of the image forming apparatus 1 and conditions that can be handled thereby.

Referring to FIG. 5B, the functional conditions table TL02 indicates conditions regarding "color scan/black-and-white scan", i.e., conditions regarding colors used for scanning an image. The conditions are sorted into conditions to be used for scan in color mode (color scan) and conditions to be used for scan in black-and-white mode (black-and-white scan).

Referring to FIG. 5C, the functional conditions table TL03 indicates conditions regarding the use of the ADF.

Referring to FIG. 5D, the functional conditions table TL04 indicates conditions regarding surfaces to be scanned for the case of scanning an image.

Referring to FIG. 5E, the functional conditions table TL05 indicates conditions regarding resolution for the case of scanning an image, i.e., scan resolution.

Referring to FIG. 6A, the functional conditions table TL06 indicates conditions regarding file transfer destinations. The conditions are sorted into conditions for a transfer destination where a plurality of users can share a transferred file (sharable saving destination) and conditions for a transfer destination where a transferred file cannot be shared (non-sharable saving destination).

Referring to FIG. 6B, the functional conditions table TL07 indicates conditions regarding compression methods.

Referring to FIG. 6C, the functional conditions table TL08 indicates conditions regarding sizes of an image resulting from a scan process.

Referring to FIG. 6D, the functional conditions table TL09 indicates conditions regarding colors used for the case of printing an image. The conditions are sorted into conditions to be applied for printing using toner except black toner and conditions to be applied for printing only using black toner.

Referring to FIG. 6E, the functional conditions table TL10 indicates conditions regarding colors used for the case of delivering an image. The conditions are sorted into conditions to be applied for delivery of an image containing color components other than black and white components, and conditions to be applied for delivery of an image containing only black and white components.

Referring to FIG. 7A, the functional conditions table TL11 indicates conditions regarding methods for obtaining a file of an image to be printed. The conditions are sorted into conditions to be used for the case of obtaining a file from another device such as the server 2 via the communication line 4, and conditions to be used for the case of obtaining a file from a medium such as a USB flash memory via the USB interface 10$j$ or the wireless interface 10$k$.

Referring to FIG. 7B, the functional conditions table TL12 indicates conditions regarding ground designs to be printed together with a target image.

Referring to FIG. 7C, the functional conditions table TL13 indicates conditions regarding how to confirm a print target image before printing the image.

Referring to FIG. 7D, the functional conditions table TL14 indicates conditions regarding finishes to be applied to a printed matter. The conditions are sorted into conditions to be used for the case of stapling the printed matter and conditions to be used for the case of punching the printed matter.

Referring to FIG. 7E, the functional conditions table TL15 indicates conditions regarding so-called photographic printing.

Referring back to FIG. 4, the job ticket data storage portion 103 of the image forming apparatus 1 stores, therein, job ticket data 5B for each job ticket.

The job ticket registration processing portion 104 performs a process for generating job ticket data 5B in accordance with a command given by a user to store the generated job ticket data 5B in the job ticket data storage portion 103 in the following manner.

The user enters a predetermined command on the operational panel 10$h$. Responding to this operation, the job ticket registration processing portion 104 displays the job ticket registration screen SN1 shown in FIG. 8 on the touchscreen 10$h$1.

A function list LT11, a ticket structure list LT12, and so on are provided on the job ticket registration screen SN1. The function list LT11 indicates functions equipped in the image forming apparatus 1. The ticket structure list LT12 indicates functions contained in a job ticket to be generated. However, at a time when the job ticket registration screen SN1 appears, no functions are shown in the ticket structure list LT12.

The user selects, from among the functions shown in the function list LT11, functions to be added to the job ticket in the execution order. In order to select a function, the user selects a function name corresponding to a desired function and presses an "ADD" button. Responding to this operation, the selected functions are added to the ticket structure list LT12 as shown in FIG. 9.

For example, in order to add a job ticket for Scan_To_Document shared, the user selects a "scan" function and a "file transfer" function in this order from the function list LT11.

The user, then, enters a name of the job ticket into the "job ticket name" textbox. The user can give any name to the job ticket; however he/she is required to give a name different from names of the other job tickets. The user, then, presses an "OK" button.

In response to the "OK" button being pressed, the job ticket registration processing portion 104 displays, on the touchscreen 10$h$1, for each of the selected functions, a condition specifying screen on which the user selects conditions to be used for causing the image forming apparatus 1 to execute the function.

In the case where, for example, the user selects the scanning function and the file transfer function, the job ticket registration processing portion 104 displays the conditions specifying screen SN2 as shown in FIG. 10. In the illustrated example, the user specifies, on the conditions specifying screen SN2, conditions of five condition types as conditions for a process necessary for the scanning function. A set of a pull-down menu Pa and a pull-down menu Pb is provided for each condition type on the conditions specifying screen SN2. Processes necessary for the individual functions and the condition types of the individual processes are predefined.

The pull-down menu Pa is to select condition details. In response to a triangular button provided on the right of the pull-down menu Pa being pressed, the job ticket registration processing portion 104 displays a list of conditions indicated in a narrow concept of a functional conditions table TL (refer to FIGS. 5A-7E) of a condition type corresponding to the pull-down menu Pa.

For example, if the triangular button of the pull-down menu Pa for image data format is pressed, then the job ticket registration processing portion 104 displays a list of fifteen conditions in total, i.e., eleven conditions indicated in the narrow concept field and four conditions indicated in the broad concept field of the functional conditions table TL01 shown in FIG. 5A.

The user selects a desired condition from the list of conditions thus displayed; thereby to specify the condition.

On the other hand, the pull-down menu Pb is to specify whether changing the condition is allowed or forbidden for the case of using the job ticket to execute the job later. In response to a triangular button provided on the right of the pull-down menu Pb being pressed, the job ticket registration processing portion 104 displays an option "allowed" which means allowing a user to change the condition and an option "denied" which means forbidding a user to change the condition. The user, then, selects either "allowed" or "denied" on the pull-down menu Pb.

Likewise, with respect to the other condition types, the user uses the pull-down menus Pa and the pull-down menus Pb to determine conditions and the permission to change the condition and lack thereof. Likewise, as for the remaining selected functions, the user specifies, on the corresponding conditions specifying screens, conditions of the individual condition types and the permission to change the condition and lack thereof.

Thereafter, the job ticket registration processing portion 104 generates job ticket data 5B shown in FIG. 11 indicating the details entered, selected, or specified in the foregoing manner. The job ticket registration processing portion 104, then, stores the generated job ticket data 5B in the job ticket data storage portion 103.

The user can create various job tickets by combining the functions and the conditions in various ways. A plurality of pieces of job ticket data 5B of the job tickets thus created are stored into the job ticket data storage portion 103.

It is also possible to copy job ticket data 5B used in another image forming apparatus and to store job ticket data resulting from the copy process in the job ticket data storage portion 103.

[Execution of Job by Using Job Ticket]

Figure 12:
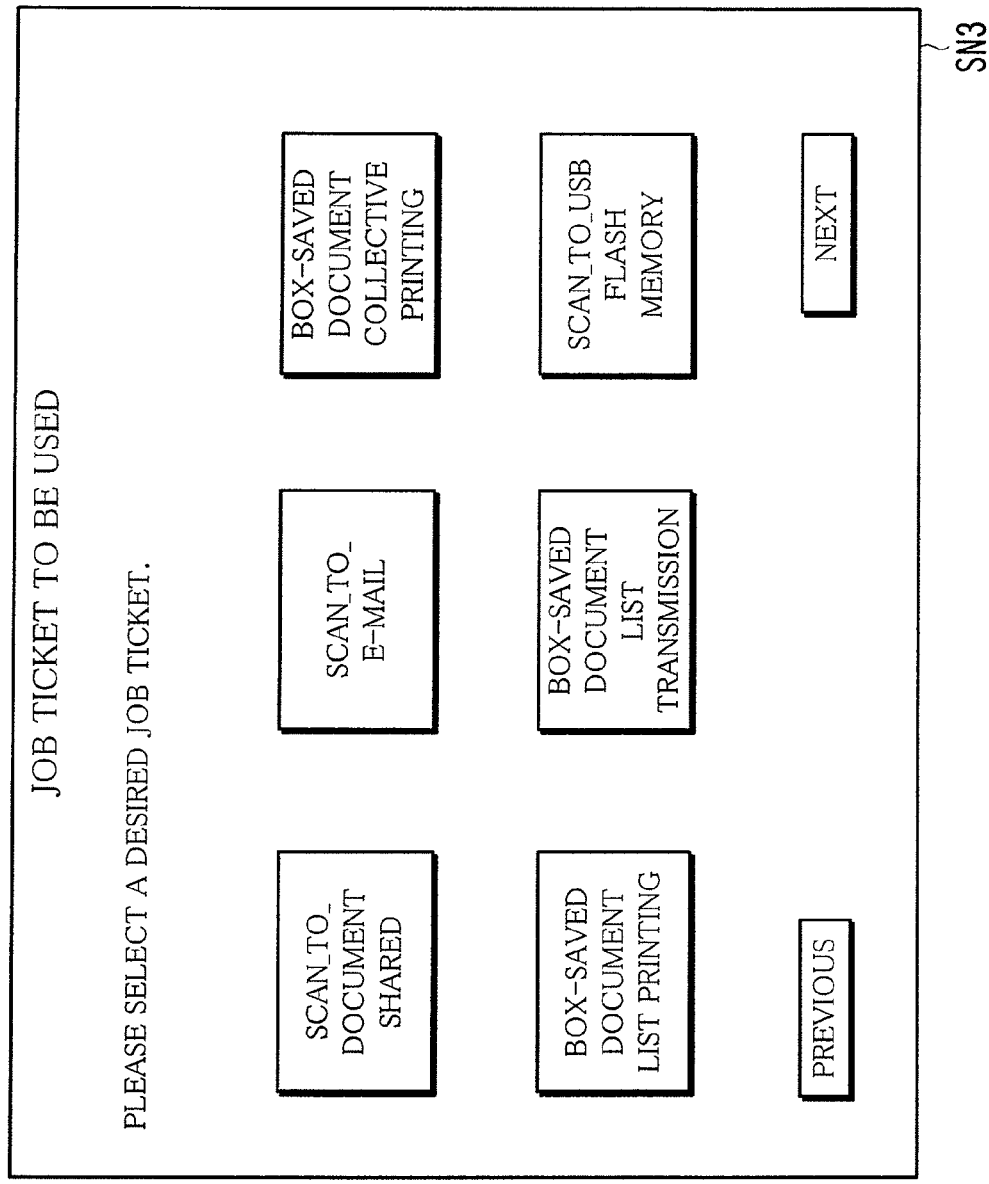
FIG. 12 is a diagram illustrating an example of a job ticket list screen.

FIG. 12 is a diagram illustrating an example of a job ticket list screen SN3, and FIG. 13 is a diagram illustrating an example of a job execution screen SN4.

When a user enters a predetermined command, the job ticket list showing portion 121 displays, on the touchscreen 10*h*1, the job ticket list screen SN3 shown in FIG. 12 indicating a list of job tickets whose job ticket data 5B are stored in the job ticket data storage portion 103. The user selects a job ticket corresponding to a job to be executed on the job ticket list screen SN3.

The job ticket selection receiving portion 122 receives the selection of the job ticket from the user. Hereinafter, the job ticket selected in this way is referred to as a "selected job ticket".

The job ticket data reading portion 123 reads out job ticket data 5B of the selected job ticket from the job ticket data storage portion 103. In the case where, for example, the selected job ticket is a job ticket for Scan_To_Document shared, the job ticket data reading portion 123 reads out job ticket data 5B containing the details shown in FIG. 11 from the job ticket data storage portion 103.

The functional conditions table reading portion 124 reads out, from the functional conditions data storage portion 101, the functional conditions tables TL of the individual functions indicated in the job ticket data 5B thus read out, i.e., the functional conditions tables TL of the individual functions constituting the selected job ticket.

The job execution screen displaying portion 125 displays the job execution screen SN4 shown in FIG. 13 on the touchscreen 10*h*1 based on the job ticket data 5B read out and the functional conditions tables TL read out. A pull-down menu Pd is provided, on the job execution screen SN4, for each condition type of each function indicated in the job ticket data 5B. At a time when the job execution screen SN4 is displayed, functions and conditions of condition types indicated in the job ticket data 5B are pre-selected in the pull-down menus Pd.

The user can change conditions for a job to be executed using the job ticket on the job execution screen SN4 and cause the image forming apparatus 1 to execute the job. Note that, in conventional technologies, it is impossible to change a condition of a condition type for which making a change is not allowed. In the image forming apparatus 1, however, the user can make a change as long as the change falls within a pre-defined concept. In order to change a condition, the user presses a triangular button provided on the right of the pull-down menu Pd corresponding to a condition type whose condition is to be changed.

In response to the triangular button being pressed, the job execution screen displaying portion 125 displays a list of conditions indicated in a narrow concept of the functional conditions table TL for the condition type corresponding to the pull-down menu Pd. The user selects a desired condition from the list.

Note that all the conditions indicated in the narrow concept are displayed only for a case where "allowed" is specified in the "change allowed/denied" field corresponding to the condition type (see FIG. 11). In the case where "denied" is specified therein, conditions pre-specified in the job ticket and other conditions corresponding to the same broad concept group as that of the pre-specified conditions are added to the list. However, other conditions corresponding to the other broad concept groups are not added to the list.

To be specific, as shown in FIG. 11, suppose that "compact PDF" is specified as a condition (condition details) of a condition type named "image data format", and at the same time, if "denied" is specified in the "change allowed/denied" field corresponding to the condition "compact PDF". In such a case, as shown in the functional conditions table TL01 of FIG. 5A, the job execution screen displaying portion 125 displays a list of five conditions falling under "PDF" to which the compact PDF belongs. Conditions falling under "JPEG", "XPS", and "TIFF" are not displayed in such a case. On the other hand, suppose that "compact PDF" is specified as the condition of "image data format", and at the same time, if "allowed" is specified in the "change allowed/denied" field corresponding to the condition "compact PDF". In such a case, the job execution screen displaying portion 125 displays a list of all the eleven conditions indicated in the functional conditions table TL01.

The user changes a condition if necessary, and presses the "OK" button; thereby to instruct the image forming apparatus 1 to execute the job.

Referring back to FIG. 4, in the case where a condition is changed to another on the job execution screen SN4, the job ticket rewriting portion 126 rewrites the job ticket data 5B read out by the job ticket data reading portion 123 in line with the change details.

The job control portion 127 executes the job based on job ticket data 5B resulting from the rewrite by the job ticket rewriting portion 126. The job is executed by starting the functions indicated in the job ticket data 5B in order, and operating each piece of hardware of the image forming apparatus 1 depending on the individual conditions.

Figure 14:
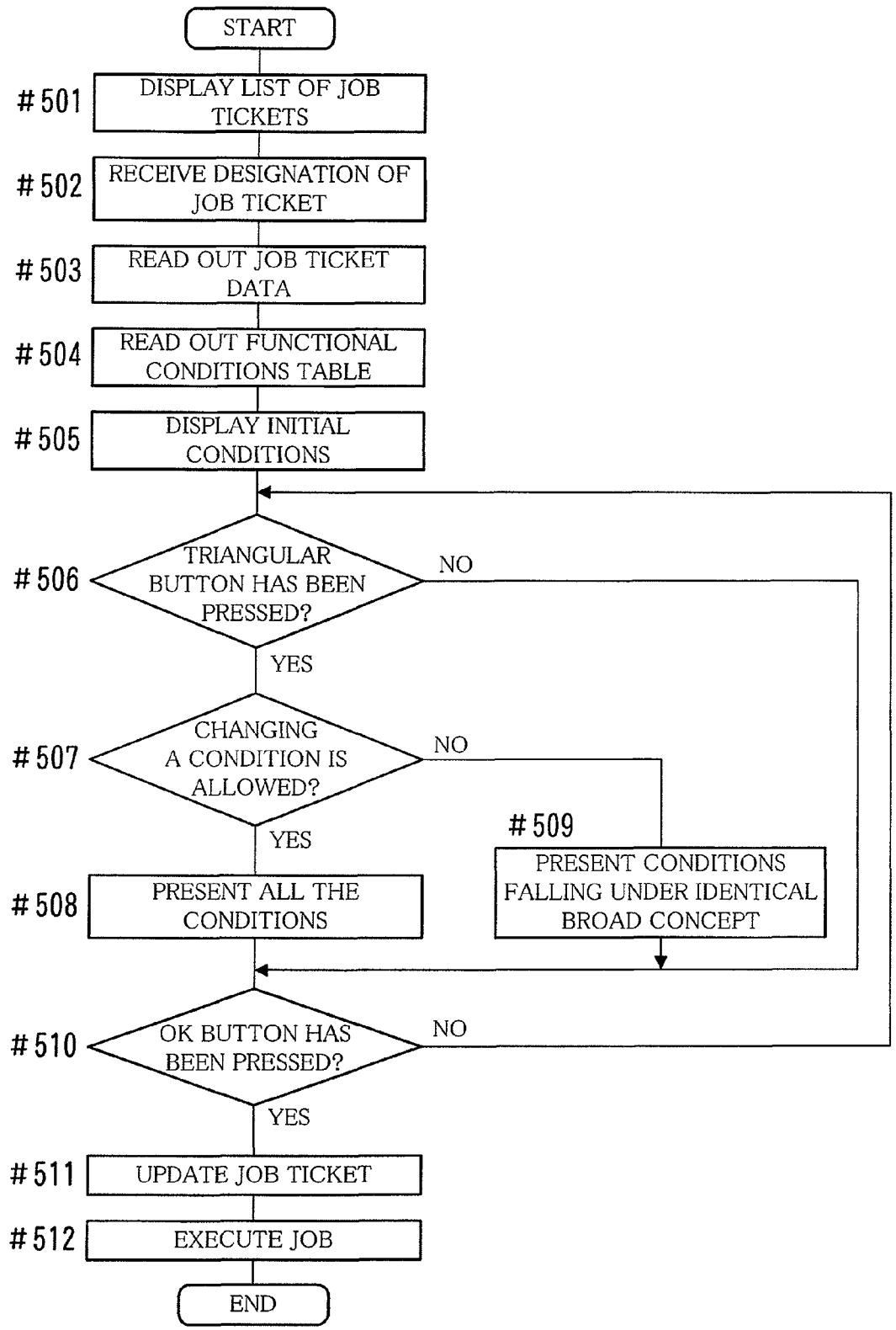
FIG. 14 is a flowchart depicting an example of the overall processing flow of an image forming apparatus executing a job for a case where a job ticket is used.

FIG. 14 is a flowchart depicting an example of the overall processing flow of the image forming apparatus 1 executing a job for a case where a job ticket is used.

Descriptions are provided below, with reference to the flowchart of FIG. 14, of the overall processing flow of the image forming apparatus 1 for the case of using a job ticket. The processes shown in FIG. 14 are performed under the control of the CPU 10*a* based on the programs stored in the storage medium such as the ROM 10*c* or the hard disk 10*d*.

Referring to FIG. 14, upon receiving a predetermined command, the image forming apparatus 1 displays the job ticket list screen SN3 as shown in FIG. 12 (#501). A user designates, on the job ticket list screen SN3, a job ticket appropriate for a job to be executed by pressing a button corresponding to the job ticket.

When receiving the designation by the user (#502), the image forming apparatus 1 reads out job ticket data 5B of the job ticket designated by the user (#503). The image forming apparatus 1 further reads out functional conditions tables TL of condition types of processes necessary for the individual functions indicated in the job ticket data 5B (#504).

The image forming apparatus 1 displays (#505), based on the job ticket data 5B and the functional conditions tables TL thus read out, the job execution screen SN4 shown in FIG. 13 in which preset conditions are reflected. The user can change a condition of any condition type on the job execution screen SN4 if necessary.

When the user presses a triangular button of a pull-down menu Pd corresponding to a condition type of a condition to be changed, the image forming apparatus 1 provides options for conditions in the following manner depending on whether or not a condition of the condition type can be or cannot be changed.

If the job ticket data 5B indicates that changing a condition of the condition type is allowed (Yes in #507), then the image forming apparatus 1 displays, as the options, a list of all the conditions indicated in the functional conditions table TL for the condition type (#508).

On the other hand, if the job ticket data 5B indicates that changing a condition of the condition type is forbidden (No in #507), then the image forming apparatus 1 displays, as the options, a list of only conditions corresponding to the same broad concept as that of the current condition (#509).

The user selects a desired condition from among the conditions thus displayed, so that a condition that has been set in the job ticket data 5B is changed to the desired condition. The user may change conditions of a plurality of condition types, or, alternatively, may not change any of the conditions. Upon completion of the necessary change, the user presses the "OK" button.

Responding to this operation (Yes in #510), the image forming apparatus 1 updates (#511) the job ticket data 5B that has been read out in Step #503 depending on the user's operation performed on the job execution screen SN4, and executes the job (#512).

[Case of Using Job Ticket for Another Image Forming Apparatus]

FIG. 15 is a diagram illustrating an example of job ticket data 7B; and FIG. 16 is a diagram illustrating an example of the job execution screen SN4.

It is possible to copy job ticket data for another image forming apparatus, i.e., an image forming apparatus 1', having specifications different from those of the image forming apparatus 1, and to use, in the image forming apparatus 1, job ticket data resulting from the copy process. However, conditions indicated in the resulting job ticket data sometimes do not correspond to any of the conditions of the narrow concepts illustrated in FIGS. 5A-7E. This is because the original job ticket data is probably generated in conformity with the specifications of the image forming apparatus 1'. Descriptions are provided below as to how to handle such a job ticket.

The image forming apparatus 1' is configured to handle only a so-called original PDF and not configured to handle various other types of enhanced PDFs. Accordingly, as shown in FIG. 15, job ticket data 7B of a job ticket in which "PDF" is simply set as a condition of the condition type "image data format" is used in the image forming apparatus 1'. Stated differently, the comparison between FIG. 11 and FIG. 15 shows that a condition of a narrow concept falling under "PDF", e.g., "compact PDF" is not set in the job ticket data 7B. This is because "PDF" is a condition corresponding to the most narrow concept in the image forming apparatus 1'.

In the case where the job ticket data 7B is copied, the job ticket data storage portion 103 of the image forming apparatus 1 is caused to store the resultant job ticket data therein, and a user operates the image forming apparatus 1 to use the resultant job ticket data, the image forming apparatus 1 operates in the following manner.

When the user specifies a job ticket corresponding to the job ticket data 7B obtained by the copy described above, the image forming apparatus 1 reads out the job ticket data 7B, and further, reads out functional conditions tables TL of condition types of processes necessary for the individual functions indicated in the job ticket data 7B. The image forming apparatus 1, then, displays the job execution screen SN4 as shown in FIG. 16 in which conditions indicated in the job ticket data 7B are reflected. As seen from the comparison between FIG. 13 and FIG. 16, a condition reflected in the pull-down menu Pd of image data format of FIG. 16 is not "compact PDF" but "PDF".

When the user presses the triangular button of the pull-down menu Pd of image data format, the image forming apparatus 1 searches for a broad concept under which "PDF" is indicated as a narrow concept based on the functional conditions table TL01 (see FIG. 5A). If it is found that the functional conditions table TL01 does not include such a broad concept, then the image forming apparatus 1 checks whether or not "PDF" corresponds to a broad concept. If determining that "PDF" corresponds to a broad concept, then the image forming apparatus 1 displays, as options for condition change, a list of conditions corresponding to a narrow concept falling under "PDF": "original PDF"; "compact PDF"; "outline PDF"; "searchable PDF"; and "PDF/A". The user selects a desired condition from among the options. The image forming apparatus 1 executes a job based on the condition selected by the user.

If the user confirms that "PDF" is specified on the job execution screen SN4 and presses an "OK" button as-is, then the image forming apparatus 1 uses a condition indicated first as conditions falling under "PDF" in the functional conditions table TL01, i.e., "original PDF" in the example of FIG. 5A, and executes the job.

The case of updating the job ticket data 7B that has been read out is described in the foregoing example. The image forming apparatus 1 preferably shows options, and the like, also when job ticket data 7B stored in the job ticket data storage portion 103 is updated to conform with the specifications of the image forming apparatus 1.

The embodiment described above enables a user to use a job ticket more flexibly than is conventionally possible, taking conditions for which making a change is not allowed into consideration. In addition, even in the case of using image forming apparatuses having different specifications from each other, a job ticket can be passed and received from one to the other more easily than with the conventional methods.

In the embodiment discussed above, the various conditions are classified as shown in FIGS. 5A-7E. However, how to classify the conditions may be modified appropriately depending on the purpose or environment of the use of the image forming apparatus 1.

In the embodiment, for example, conditions for image data format are classified into a JPEG group, a PDF group, an XPS group, and a TIFF group, as shown in FIG. 5A. Some reasons for the classification are as follows: A user using a job ticket including conditions falling under the PDF group, e.g., "original PDF", has selected this job ticket probably because he/she intends to handle a document or the like by using an application corresponding to PDF; and a creator of the job ticket probably allows some changes to be made flexibly as long as the image data format falls within the PDF group, i.e., falls within a predetermined range, instead of strictly applying the rule.

It is also possible to change the way for classifying conditions for image data format. Such conditions may be classified, for example, depending on when the image data format has been available on the market.

As shown in FIG. 7A of this embodiment, concerning conditions for methods for obtaining an image file, a method for obtaining an image file via the communication line 4 is defined as a pull printing group. Some reasons for the definition are as follows: A user using a job ticket including any one of these conditions intends to use a file stored in another device, e.g., the server 2, of the network system NS for printing, and therefore, there is probably no problem as long as a specific file is delivered to the user in the end irrespective of which protocol is used, or the like; and the definition described above enables the user to achieve his/her purpose even if a file based on conditions included in an intended job ticket cannot be obtained for some reasons.

Modifications can be made to the classification shown in FIG. 7A. For example, "SMB pull printing" and "FTP pull printing" may be defined as one group and "browser pull printing" and "WebDAV pull printing" may be defined as another group in an organization where the use of a Web browser is limited during work.

In this embodiment, as shown in FIGS. 6D and 6E, color output conditions are defined as one group. A reason for the definition is as follows: There is probably no problem in bill if a change is made to conditions for color output in environment where the usage fee for color output is different from that for black-and-white output.

Modifications can be made to the classification shown in FIGS. 6D and 6E. For example, grouping is possible from the viewpoint of the sharpness of an image. To be specific, "full color", "grayscale", and "automatic color" can be deemed as one group, while the others can be deemed as another group. The "automatic color" is a condition in which printing is made only by using black toner for an image having only black and white components, and printing is made by using individual color toners for an image having color components.

In the embodiment, the description takes the example of a job ticket, in particular, for Scan_To_Document shared; however, other various job tickets may be handled in the embodiment.

Another configuration is possible in which, if a plurality of image forming apparatuses 1 are provided in the network system NS, the server 2 manages job ticket data 5B collectively, and provides an image forming apparatus 1 with job ticket data 5B upon the request therefrom.

In the embodiments discussed above, the overall configurations of the network system NS, the configurations of various portions thereof, the content to be processed, the processing order, the structure of the data, and the like may be altered as required in accordance with the subject matter of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. An image processing apparatus comprising:
   a job ticket data obtaining portion that obtains job ticket data, the job ticket data indicating a job involving a plurality of processes, first conditions used for performing the plurality of processes, and information on whether changing each of the first conditions is allowed or not;
   a group data obtaining portion that obtains group data indicating a first group and a second group, the first group being made by grouping second conditions having a common concept, the second group being made by grouping the first group having a common concept;
   a presenting portion that shows options for changing at least one of the first conditions indicated in the job ticket data in the following manner, wherein
      if the job ticket data indicates that changing said at least one of the first conditions is allowed, then the presenting portion shows the second conditions belonging to the second group to which an identical condition belongs, the identical condition being one of the second conditions and being identical to said at least one of the first conditions, and
      if the job ticket data indicates that changing said at least one of the first conditions is not allowed, then the presenting portion shows the second conditions included in the first group to which the identical condition belongs; and
   a job execution portion that executes the job based on a selected option and the job ticket data in such a manner that the selected option takes precedence over the job ticket data.

2. The image processing apparatus according to claim 1, wherein the group data obtaining portion obtains, as the group data, data indicating conditions applicable to the image processing apparatus as the second conditions.

3. An image processing apparatus comprising:
   a job ticket data obtaining portion that obtains job ticket data, the job ticket data indicating a job involving a plurality of processes, first conditions used for performing the plurality of processes, and information on whether changing each of the first conditions is allowed or not;
   a group data obtaining portion that obtains group data indicating a first group and a second group, the first group being made by grouping second conditions having a common concept, the second group being made by grouping the first group having a common concept;
   a presenting portion that shows options for changing at least one of the first conditions indicated in the job ticket data in the following manner, wherein
      if the job ticket data indicates that changing said at least one of the first conditions is allowed, and if the group data indicates an identical condition that is one of the second conditions and is identical to said at least one of the first conditions, then the presenting portion shows the second conditions belonging to the second group to which the identical condition belongs,
      if the job ticket data indicates that changing said at least one of the first conditions is allowed, and if the group data indicates, as the first group, a sub group including a condition that corresponds to a narrow concept of said at least one of the first conditions as the second condition, then the presenting portion shows the second conditions belonging to the second group to which the sub group belongs,
      if the job ticket data indicates that changing said at least one of the first conditions is not allowed, and if the group data indicates the identical condition, then the presenting portion shows the second conditions included in the first group to which the identical condition belongs, and
      if the job ticket data indicates that changing said at least one of the first conditions is not allowed, and if the group data indicates the sub group, then the presenting portion shows the second conditions included in the sub group; and
   a job execution portion that executes the job based on a selected option and the job ticket data in such a manner that the selected option takes precedence over the job ticket data.

4. The image processing apparatus according to claim 3, wherein the group data obtaining portion obtains, as the group data, data indicating conditions applicable to the image processing apparatus as the second conditions.

5. A method for executing a job, the method comprising:
causing an image processing apparatus to obtain job ticket data, the job ticket data indicating a job involving a plurality of processes, first conditions used for performing the plurality of processes, and information on whether changing each of the first conditions is allowed or not;
causing the image processing apparatus to obtain group data indicating a first group and a second group, the first group being made by grouping second conditions having a common concept, the second group being made by grouping the first group having a common concept;
causing the image processing apparatus to show options for changing at least one of the first conditions indicated in the job ticket data in the following manner, wherein
if the job ticket data indicates that changing said at least one of the first conditions is allowed, then the image processing apparatus is caused to show the second conditions belonging to the second group to which an identical condition belongs, the identical condition being one of the second conditions and being identical to said at least one of the first conditions, and
if the job ticket data indicates that changing said at least one of the first conditions is not allowed, then the image processing apparatus is caused to show the second conditions included in the first group to which the identical condition belongs; and
causing the image processing apparatus to execute the job based on a selected option and the job ticket data in such a manner that the selected option takes precedence over the job ticket data.

6. The method according to claim 5, wherein the image processing apparatus is caused to obtain, as the group data, data indicating conditions applicable to the image processing apparatus as the second conditions.

7. A non-transitory computer-readable storage medium storing thereon a computer program used in an image processing apparatus, the computer program causing the image processing apparatus to perform:
a job ticket data obtaining process of obtaining job ticket data, the job ticket data indicating a job involving a plurality of processes, first conditions used for performing the plurality of processes, and information on whether changing each of the first conditions is allowed or not;
a group data obtaining process of obtaining group data indicating a first group and a second group, the first group being made by grouping second conditions having a common concept, the second group being made by grouping the first group having a common concept;
a presenting process of showing options for changing at least one of the first conditions indicated in the job ticket data in the following manner, wherein
if the job ticket data indicates that changing said at least one of the first conditions is allowed, then the second conditions belonging to the second group to which an identical condition belongs is shown, the identical condition being one of the second conditions and being identical to said at least one of the first conditions, and
if the job ticket data indicates that changing said at least one of the first conditions is not allowed, then the second conditions included in the first group to which the identical condition belongs is shown; and
a process of executing the job based on a selected option and the job ticket data in such a manner that the selected option takes precedence over the job ticket data.

8. The non-transitory computer-readable storage medium according to claim 7, wherein the image processing apparatus is caused to obtain, as the group data, data indicating conditions applicable to the image processing apparatus as the second conditions.

* * * * *